United States Patent
Chang et al.

(10) Patent No.: US 8,606,860 B2
(45) Date of Patent: Dec. 10, 2013

(54) SYSTEM AND METHOD FOR PROVIDING FILTERING EMAIL MESSAGES

(75) Inventors: William I. Chang, Saratoga, CA (US); Josiah Carlson, Irvine, CA (US)

(73) Assignee: Affini, Inc., Saratoga, CA (US)

( * ) Notice: Subject to any disclaimer, the term of this patent is extended or adjusted under 35 U.S.C. 154(b) by 793 days.

(21) Appl. No.: 11/256,674

(22) Filed: Oct. 20, 2005

(65) Prior Publication Data

US 2006/0168059 A1 Jul. 27, 2006

Related U.S. Application Data

(63) Continuation-in-part of application No. 10/814,010, filed on Mar. 30, 2004.

(60) Provisional application No. 60/621,441, filed on Oct. 22, 2004, provisional application No. 60/458,287, filed on Mar. 31, 2003, provisional application No. 60/540,989, filed on Jan. 31, 2004.

(51) Int. Cl.
*H04L 29/06* (2006.01)

(52) U.S. Cl.
USPC ............ 709/206; 709/207; 709/217; 709/219

(58) Field of Classification Search
USPC .................................. 709/203–207, 217–219
See application file for complete search history.

(56) References Cited

U.S. PATENT DOCUMENTS

| 5,742,769 | A |   | 4/1998  | Lee et al. |         |
|-----------|---|---|---------|------------|---------|
| 5,999,967 | A |   | 12/1999 | Sundsted   |         |
| 6,112,227 | A |   | 8/2000  | Heiner     |         |
| 6,199,102 | B1|   | 3/2001  | Cobb       |         |
| 6,246,996 | B1|   | 6/2001  | Stein et al. |       |
| 6,393,464 | B1|   | 5/2002  | Dieterman  |         |
| 6,574,658 | B1|   | 6/2003  | Gabber et al. |      |
| 6,587,550 | B2|   | 7/2003  | Council et al. |     |
| 6,708,205 | B2|   | 3/2004  | Sheldon et al. |     |
| 6,757,742 | B1| * | 6/2004  | Viswanath  | 709/246 |
| 6,836,792 | B1| * | 12/2004 | Chen       | 709/203 |
| 6,965,918 | B1| * | 11/2005 | Arnold et al. | 709/206 |
| 7,085,745 | B2|   | 8/2006  | Klug       |         |
| 7,092,992 | B1| * | 8/2006  | Yu         | 709/206 |
| 7,120,927 | B1| * | 10/2006 | Beyda et al. | 709/206 |
| 7,219,070 | B2|   | 5/2007  | Antonello et al. |   |

(Continued)

OTHER PUBLICATIONS

An Assurance Systems Brief: Avoid the Spam Filter Trap, Oct. 2002, pp. 1-9, www.assurancesys.com.
IRTF Research Groups: Anti-Spam Research Group (ASRG), Nov. 11, 2003, pp. 1-3, www.irtf.org/charters/asrg.html.
Return Path, Inc., First Half 2003 Email Blocking and Filtering Report, 2003, p. 1, www.returnpath.biz.

(Continued)

*Primary Examiner* — Ian N Moore
*Assistant Examiner* — Jenee Alexander
(74) *Attorney, Agent, or Firm* — Edward C. Kwok; Hogan Lovells US LLP

(57) ABSTRACT

A method for filtering email messages for a user, includes (a) obtaining from the user a first set of email addresses over which the user asserts authority and a second set of email addresses from which email messages are to be accepted; (b) obtaining from the email messages the sender and recipient email addresses; and (c) filtering the email messages directed to any one of the email addresses in the first set of email addresses according to the second set of email addresses. In one implementation, accepted email addresses are generalized from the second set of email addresses. Once a user's email address is accepted, email from email addresses owned by the same sender are automatically accepted.

17 Claims, 14 Drawing Sheets

(56) References Cited

U.S. PATENT DOCUMENTS

| | | |
|---|---|---|
| 7,283,974 B2 | 10/2007 | Katz et al. |
| 7,364,068 B1 | 4/2008 | Strubbe et al. |
| 7,552,176 B2 | 6/2009 | Atkinson et al. |
| 7,660,844 B2 * | 2/2010 | Takase et al. ............... 709/203 |
| 7,809,842 B2 | 10/2010 | Moran et al. |
| 8,204,945 B2 * | 6/2012 | Milliken et al. ............. 709/206 |
| 2002/0026513 A1 * | 2/2002 | Hoglund et al. ............. 709/206 |
| 2002/0032602 A1 | 3/2002 | Lanzillo, Jr. et al. |
| 2002/0099605 A1 | 7/2002 | Weitzman et al. |
| 2002/0120702 A1 | 8/2002 | Schiavone et al. |
| 2003/0023692 A1 * | 1/2003 | Moroo ......................... 709/206 |
| 2003/0040963 A1 | 2/2003 | Kogler et al. |
| 2003/0163485 A1 | 8/2003 | Goodwin et al. |
| 2003/0195807 A1 | 10/2003 | Maggio et al. |
| 2003/0233419 A1 | 12/2003 | Beringer |
| 2004/0054574 A1 | 3/2004 | Kaufman et al. |
| 2004/0073617 A1 * | 4/2004 | Milliken et al. ............. 709/206 |
| 2004/0133561 A1 * | 7/2004 | Burke .............................. 707/3 |
| 2004/0177120 A1 * | 9/2004 | Kirsch ......................... 709/206 |
| 2004/0243676 A1 | 12/2004 | Blankenship |
| 2004/0243847 A1 | 12/2004 | Way |
| 2005/0004837 A1 | 1/2005 | Sweeney et al. |
| 2005/0055321 A1 | 3/2005 | Fratkina et al. |
| 2005/0080856 A1 * | 4/2005 | Kirsch ......................... 709/206 |
| 2005/0097177 A1 * | 5/2005 | McUmber et al. ........... 709/206 |
| 2005/0198173 A1 * | 9/2005 | Evans .......................... 709/206 |
| 2006/0041505 A1 | 2/2006 | Enyart |
| 2007/0038718 A1 * | 2/2007 | Khoo et al. ................... 709/206 |
| 2007/0083438 A1 | 4/2007 | Coleman |
| 2012/0173628 A1 | 7/2012 | Briere et al. |

OTHER PUBLICATIONS

Metz, C., Spam Blockers, article from PC Magazine, Feb. 17, 2004, pp. 1-2.

Fahlman, S., Selling Interrupt Rights: A Way to Control Unwanted E-Mail and Telephone Calls, Technical Forum, IBM Systems Journal, vol. 41, No. 4, 2002, pp. 759-766.

Blumberg, M. et al., Lost Relationships: The Collateral Damage of E-mail Address Changes, Oct. 16, 2002, pp. 1-7, Return Path, Inc., and Global Name Registry, LLC.

Cobb, S., The Economics of Spam, ePrivacy Group, Feb. 2003, pp. 1-7.

Dolan, T., Seven Techniques to Improve Email List Integrity, Return Path, May 18, 2001, pp. 1-7.

Dragan, R., Mailblocks Extended Service review from PC Magazine, Feb. 17, 2004, pp. 1-3.

Glitman, R., The Bat! 2.0 review from PC Magazine, Feb. 17, 2004, 4 pgs.

Metz, C., Can E-Mail Survive?, article from PC Magazine, Feb. 17, 2004, pp. 1-5.

Metz, C., ChoiceMail 2.0 review from PC Magazine, Feb. 17, 2004, pp. 1-2.

Metz, C., IHateSpam review from PC Magazine, Feb. 17, 2004, pp. 1-4.

Roubini, J., Mobile Mail, article from PC Magazine, Feb. 17, 2004, 4 pgs.

Nail, J. et al., The Real Answer to the Spam Problem, Brief from the Forrester, Dec. 10, 2003, pp. 1-5, Forrester Research, Inc., 400 Technology Square, Cambridge, MA 02139.

* cited by examiner

1101 — GEO TAXONOMY EXAMPLE
(hierarchical encoding)

World (000001-999999)
North America (000001-499999)
  Canada
    etc.
  USA (200001-299999)
    etc.
    West Coast (230001-239999)
      California (235001-235999)
        San Francisco Bay Area (235101-235199)
        etc.
1102 — South Bay (235141-235149)
        etc.
        San Jose (235143-235146)
          district #1   235143
          district #2   235144
          etc.      1103

| | |
|---|---|
| LOCATION: South Bay | (235141-235149) |
| AGE: 18-22 | (18-22) — 1105 |
| INTERESTS: mountain-biking (free text) — 1104 | |
| GENDER: any | (1-2) |

PEOPLE DIRECTORY SEARCH

FIG. 11

1201 — MUSIC TAXONOMY EXAMPLE
(hierarchical encoding of each taxonomy tree)

1202 — FORMAT TAXONOMY
    LP                  1
1203 — CD             (2-4)
      Standard        2
      SACD            3
      DVD-Audio     4
1204 — PERIOD TAXONOMY
    Before 1900       1
1205 — 1900-1949       (2-6)
        1900-1909        2
        1910-1919        3
        1920-1929        4
        1930-1939        5
        1940-1949        6
    1950's             7
    1960's             8
    1970's             9
    1980's            10
    1990's            11
    21st Century     12
1206 — GENRE TAXONOMY
    Jazz
      Vocal             (1-2)
1207 — Solo Instrument   (3-10)
      Band             (11-15)
        strings         11
        piano and flute   12

| | |
|---|---|
| FORMAT: CD | (2-4) |
| PERIOD: 1900-1949 | (2-6) |
| 1208 — GENRE: Jazz Solo Instrument | (3-10) |

PRODUCT CATALOG SEARCH

FIG. 12

| | |
|---|---|
| Identity Confirmation | Please confirm your name: _____ organization: _____ email address: _____ You will receive a confirmation email; please click on included URL  OR  Please confirm you sent <member> an email with <subject>, and you are <name> <organization> <email address> } information extracted from email received by member |
| Identity Verification | Please enter your online payment service email address: _____  ⊙ Would you like to verify by sending $1.00 into your account?  ⊙ Would you like to verify by receiving .01¢ from us? Please confirm receipt by entering the password we send with the payment.  OR  Please enter your Credit Card information and authorization for us to charge your membership fee, and verify your name and address. |
| SPAM Filtering<br><br>checkboxes { | Would you like to receive email only from senders who<br>☒ are Verified (like you are),<br>☒ have positive internet reputation as determined by us,<br>☒ would like to send you $____ to ensure he or she catches your attention,<br>☒ are on your contact list (click here to upload),<br>☒ respond to a verification invitation we send on your behalf,<br>If so, please enter your ISP, username, password, and optional forwarding address. |
| Profile and Preferences | Please enter your location, interests, expertise, life, history, etc. |
| Contact List | ☒ let them know you vouched for them and request they reciprocate. |

USER REGISTRATION PROCESS

FIG. 14

SYSTEM AND METHOD FOR PROVIDING FILTERING EMAIL MESSAGES

CROSS-REFERENCE TO RELATED APPLICATIONS

The present application is a continuation-in-part application and claims priority under 35U.S.C. §120 to (1) provisional patent application Ser. No. 60/621,441, entitled "Systems and Methods for Filtering eMail", filed on Oct. 22, 2004, and (2) U.S. patent application Ser. No. 10/814,010, entitled "System and Method for Providing an Open eMail Directory" by William I. Chang, filed on Mar. 30, 2004, which claims priority to (a) provisional patent application Ser. No. 60/458,287, entitled "Open eMail Directory, Safe from SPAM, Supported by Advertising," filed on Mar. 31, 2003, and (b) provisional patent application Ser. No. 60/540,989, also entitled "Open eMail Directory, Safe from SPAM, Supported by Advertising," filed on Jan. 31, 2004.

BACKGROUND OF THE INVENTION

1. Field of the Invention

The present invention relates to application computer programs operating in the internet environment. In particular, the present invention relates to efficient use or management of electronic mail ("eMail") resources on the internet, such as the control of unsolicited eMail messages ("spam"), including eMail messages from commercial senders. The present invention also relates to providing an identity registry and a sender verification service.

2. Discussion of the Related Art

In March, 2003, it is reported that 41% of all eMail traffic on the internet is "spam" (i.e., unsolicited electronic mass mailing), using aggregated lists of eMail addresses culled from the internet and resold for this purpose. Since March 2003, spam has increased to between 50% and 75% of all eMail traffic according to various surveys. Spam content is often highly objectionable (e.g. pornographic). In response to this pandemic, many users and their eMail service providers use "filter" software to screen spam. However, such screening is at best only partially effective. On one hand, if a filter is set too stringently, it is possible that legitimate eMail messages may be erroneously and unintentionally removed. On the other hand, a less stringent filter may allow an undesirable number of spam messages to pass undetected through the filter.

As the skills and the technology available to the "spammers" become more sophisticated, even the more stringent filters can be defeated. Meanwhile, as the user's mailbox is filled with spam, legitimate eMail messages are increasingly likely to be overlooked by the intended recipient in the sea of spam. Consequently, legitimate transactions and opportunities may be lost. Also, when national and regional internet service providers (ISPs) go out of business, often with little prior warning, it leaves a large number of dead (i.e., out-of-service) eMail addresses. As a result, affected users lose their personal and business connections. Dead eMail addresses can also result from people changing jobs, schools, or ISPs. Meanwhile, although one can still use a search engine to search for an eMail address, people are increasingly reluctant to make their eMail addresses available in public for fear that they may be "harvested" by the spammers. Thus, the convenience and connectedness provided by eMail service are significantly degraded. At the same time, companies and other commercial senders (e.g., direct marketers) who would like to reach qualified customers and consumers are finding their messages increasingly drowned out by spammers who can indiscriminantly "shot-gun" spam at virtually no cost to themselves.

One recent response to the growing spam problem is the development of eMail software "plug-ins" which attempt to verify the sender through an auto-reply process. Such plug-ins are, however, inconvenient to install and to use. Another development is a "sender bond" software product that is available from Vanquish, Inc., Marlborough, Mass. Such a system, however, is too limited in scope. Thus, a solution is needed that allows a user to manage the amount of spam targeting his mailbox, while allowing legitimate mass eMail mailings to reach willing recipients.

SUMMARY

According to one embodiment of the present invention, a method for filtering email messages for a user includes (a) obtaining from the user a first set of email addresses over which the user asserts authority and a second set of email addresses from which email messages are to be accepted; (b) obtaining from the email messages the sender and recipient email addresses; and (c) filtering the email messages directed to any one of the email addresses in the first set of email addresses according the second set of email addresses. The email messages examined may be accepted, rejected or held in a mail-store.

In one embodiment, the second set of email addresses may include domain names, and may be specified to accept email messages sent from subdomains of certain email addresses and domain names of the second set. Once mail from any of the sender's email addresses are accepted, all subsequent email messages from any of the sender's claimed email accounts are accepted.

In one embodiment, a mapping module identifies the user given an email address.

According to one embodiment of the present invention, a method for managing email messages in a mailbox, includes (a) accessing the mailbox to fetching header information from email messages in the mailbox; (b) examining the header information of each email message to determine if the email message should be removed from the mailbox; (c) removing from the mailbox the email messages determined to be removed; and (d) logging the time at which the mailbox is accessed to indicate the email messages processed. The method can be applied to a POP3 email retrieval protocol. Further, the header information may be examined using a white-listing service. The removed email messages may be kept in a mail-store for further evaluation. Upon further examination, some email messages may be found acceptable, and returned to the mailbox, after having an authenticated token marked in the header information. The authenticated token may include information encoded using a predetermined hash-function.

According to another embodiment of the present invention, a method for determining authority over a contested email address includes (a) sending an email message to the contested email address, wherein the email message includes an authenticated token; (b) waiting for a user to act on the authenticated token in the email message; and (c) awarding authority over the contested email address to the user and disqualifying outstanding claims to the email address at the time of the user acting on the authenticated token. The method then rejects all subsequent claims over the contested email address. In one implementation, the authenticated token is embedded in a link to a resource in a wide area network.

According to another embodiment of the present invention, a corporation may implement an email system which levies a sender's fee on each email message sent between employees of the corporation. The sender's fee may be assessed according to the urgency of the message, thereby enforcing a discipline of prioritizing among the employees. Such a system would also provide rewards for those whose advice and expertise are most sought after. Such a system would also encourage employees to make their skill sets more prominently known within the company, such as by advertising their skills sets in the company's email directory.

According to another aspect of the present invention, a method for a user to provide direct feedback regarding an advertisement includes: (a) displaying the advertisement of a predetermined type to a user on a computer screen; (b) along with the display of the advertisement, providing a selectable resource on the computer screen that the user may select to indicate whether or not the user desires to see more or less of advertisements of the predetermined type; and (c) adjusting the frequency in which advertisements of the predetermined type is displayed to that user based on the user's selection of the selectable resource. The selectable resource may include selectable hyperlinks selected according to user preference with respect to the type or genre of the advertisement. The method may further include providing a reward to the user when the user selects the selectable resource, so as to induce participation in the feedback. A manager for the advertising may practice the method with a large number of users, with the results serve as a survey on the effectiveness of the advertisement particularly, or on the effectiveness of the type of advertisement the particular advertisement represents. The method may therefore include analyzing the selections by the large number of users and compiling statistics based on the selections. Such information is invaluable to advertisers as reference for future advertising campaigns, and for marketing purpose.

The present invention is better understood upon consideration of the detailed description below and the accompanying drawings.

BRIEF DESCRIPTION OF THE DRAWINGS

FIGS. 11 and 12 illustrate taxonomies and multi-dimensional queries parametrized by such taxonomies, respectively for a people directory and for a product catalog, in accordance with one embodiment of the present invention.

FIG. 14 summarizes the various, optional, steps in the user registration process, in accordance with one embodiment of the present invention.

DETAILED DESCRIPTION OF THE PREFERRED EMBODIMENTS

Figure 1:
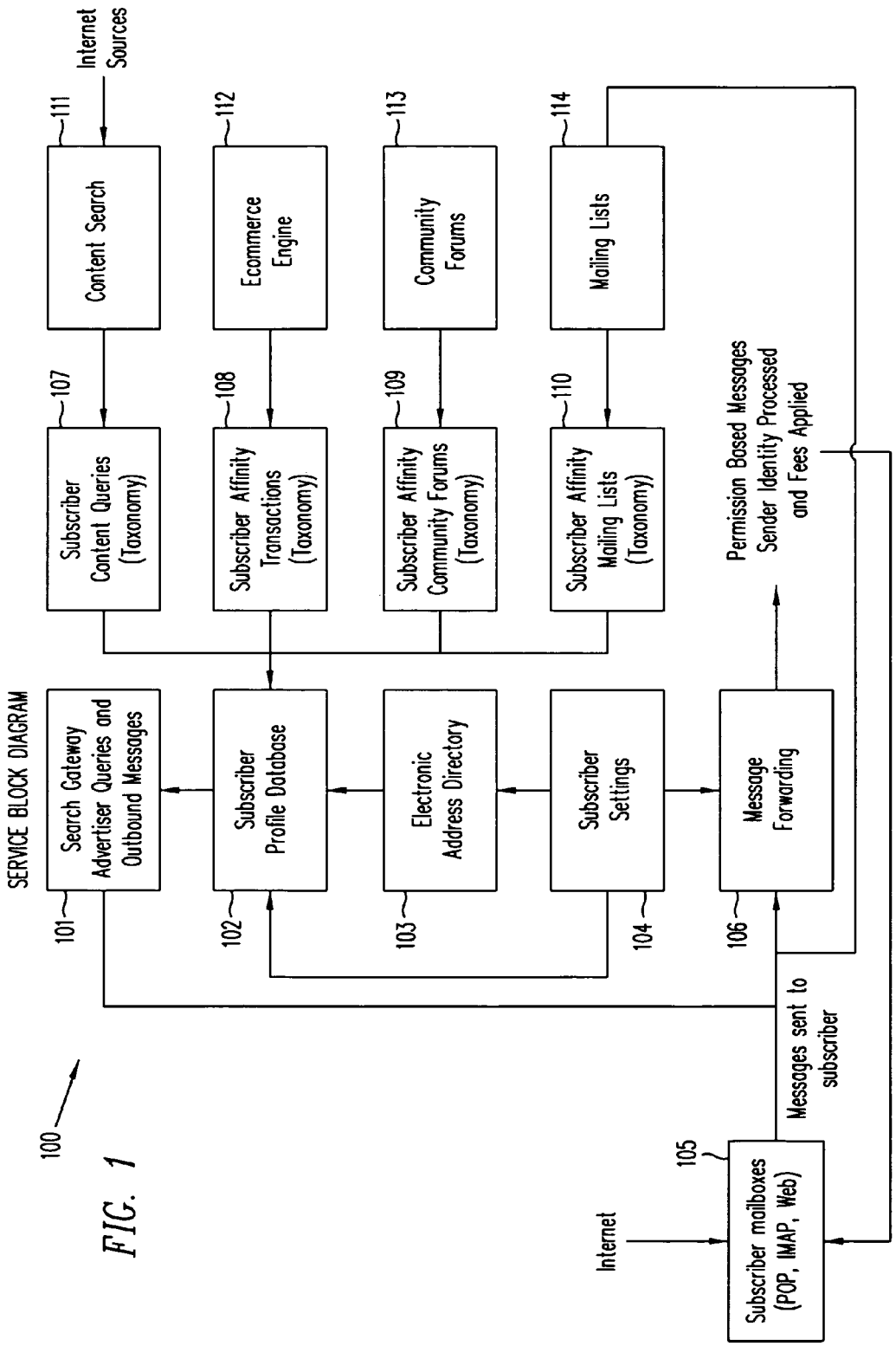
FIG. 1 is a block diagram illustrating an architecture for affinity portal 100, in accordance with one embodiment of the present invention.

According to one embodiment of the present invention, illustrated by the block diagram of FIG. 1, affinity portal 100 provides eMail and online community services. As shown in FIG. 1, affinity portal 100 is organized around a subscriber profile database 102 and electronic addresses directory 103, and search capability provided by one or more scalable, real-time parametric search engines, which can perform low-level search on the databases and on the world wide web (WWW) of the Internet. These engines provide a platform to build a number of services that are discussed in further detail below.

Subscriber profile database 102 registers biographical and "affinity" information provided by its subscribers or members. Typical biographical information includes, for example, the member's full name, maiden name, photograph, birthplace, education and work address. Typical affinity information includes the member's life history, expertise, hobbies, club memberships, collectibles, list of items for sale, list of items desired ("wish-list"), and geographical region of the member's residence. According to the member's preference and instructions, both biographical and affinity information are optional and access-controlled. Access control levels may include such levels as private, clique, club, public and advertiser. In addition, subscriber profile database is augmented by information extracted by affinity portal 100 from (1) subscriber content queries 107, which are subject matters of content searches 111 performed by the members; (2) subscriber affinity transactions 108, which are subject matters of members' commercial electronic transactions (e.g., on-line purchases) recorded, for example, by e-commerce engine 112; (3) subscriber affinity 109 from community forums 113, which represent the members' interests categorized by the types and subject matters of activities the members conduct in on-line ("virtual") communities; and (4) subscriber affinity 110 from mailing lists 114, which represent the members' interests as categorized by the subject matters of mailing lists in which the members participate. The members control access to the information in subscriber profile database 102 through subscriber settings 104.

Subscriber settings 104 also controls forwarding of eMail or electronic messages addressed to the subscribers by message forwarding service 106. For example, subscriber settings 104 allow each subscriber to specify one or more minimum sender's fees, as a condition for forwarding electronic messages in subscriber mailboxes 105 received from specified classes of electronic message senders. Thus, a member of affinity portal 100 may condition his "picking up" an eMail message[1] sent to the member through affinity portal 100 to receiving a sender's fee. After the first contact, the member may reclassify the sender to another class, e.g., "friend", so that the sender may be charged a lesser or no sender's fee for subsequent eMail messages.

[1] "Picking up an eMail message" refers to one or more of the following activities: examining messages sent to a mailbox, identifying an eMail message sent to a mailbox, opening the eMail message for reading, and deleting, marking as read, saving or replying to the eMail message, or adding the sender's name, or another's name, and eMail address to an address book.

Figure 9:
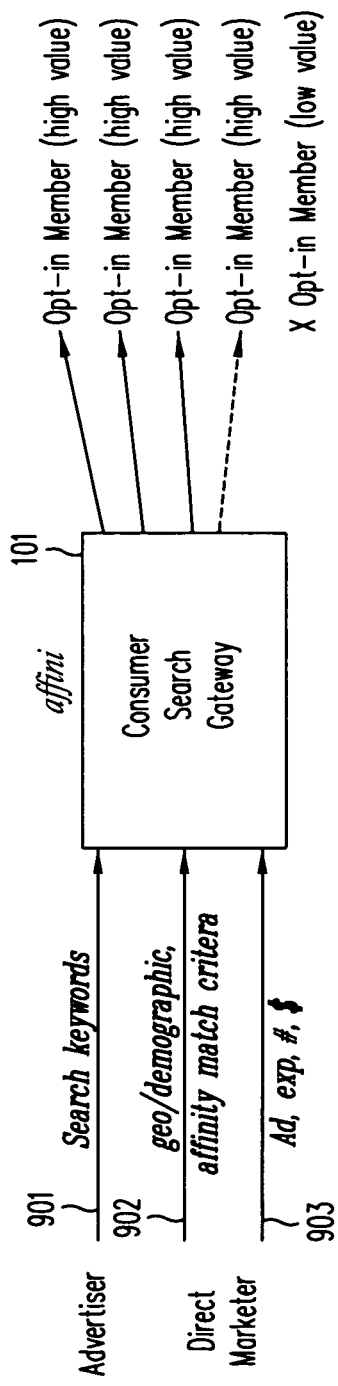
FIG. 9 is a block diagram illustrating the operations of consumer gateway service 101, provided in accordance with one embodiment of the present invention.

Electronic address directory 103 allows affinity portal 100 to offer "consumer search gateway" service 101, whose operations are illustrated by FIG. 9, enabling anyone (e.g., any commercial advertiser or direct marketer) who wishes to contact the registered members of affinity portal 100 to search the portal based on keywords (901), biographical or affinity information (902), or by the required amounts of sender's fees (903). Email messages may then be sent to the members on the search results by paying—electronically or otherwise—the specified sender's fees. Consumer search gateway 101 thus provides commercial senders high-value qualified targets who are carefully matched to the commercial sender's specified target profiles. In one embodiment, to prevent the eMail addresses retrieved being harvested by a commercial sender for resale, the eMail addresses retrieved are not revealed to the requesting commercial sender. Alternatively, certain users may have effective spam-filters installed and thus are immune to spamming, and may allow their eMail addresses to be revealed to the requesting commercial sender.

In one embodiment, a sender may obtain priority over other senders by offering a premium fee (e.g., in the case where a member of the affinity portal sets a daily maximum limit on the number of eMail messages that the member desires to receive from unsolicited sources). Any eMail message that is not picked up by the designated recipient within a sender's specified time period is automatically cancelled and its associated sender's fee refunded. At the same time, an eMail message sent without going through affinity portal 100 may trigger a sender's fee invoice to be sent from the affinity portal to the sender. In that situation, the eMail message is not forwarded to the member until the invoice is paid.

In summary, the detailed profile information—whether declarative, behavioral, or search-based—that is compiled from the many services of affinity portal 100 (e.g., content search, mailing lists, community forums) enables a commercial marketer to target its audience to a degree not previously available. Thus, the objectives of maximizing revenue efficiency, user satisfaction (both sender and recipient), and the manageability of advertising campaigns are achieved. A commercial sender can specify multiple criteria (including keywords) and the number of eMail advertisements delivered or outstanding over any time period (i.e., "throttling"). When any of the outstanding advertisements is selected by a recipient or expires due to non-selection over the specified timer period, message forwarding service 106 can automatically "roll over" the advertisement to the next matching member, sorted in order of user value and expected performance of the advertisement. The high relevance of the advertisements as well as the fact that user has control over the sender fee and possibly shares it with his affinity referrer, will make such advertising desirable to the member.

In one embodiment, affinity portal 100 provides tools to foster online community activities, such as search and topic hierarchies. Affinity portal 100 provides community forums 113 and mailing lists 114 to facilitate the congregation of its members and formation of groups. In the terminology of the affinity portal, a "clique" refers to a group eMail alias, including certain group attributes, which forwards eMail messages to its members. A "club" refers to an environment that is richer or more sophisticated than a clique. A club offers features such as a homepage, a message board, directories of people, sites or things associated with the club, a searchable list of "frequently asked questions" (i.e., "FAQs"), access to shared files, images, calendar, classified advertising, and links to other sites of interests (e.g., on-line auction sites, OpenDirectoryProject, searchable categories, other online groups or other related online communities). Club members of a hobby group can, for example, describe their collections, including identifying parts of their collections as for sale or trade, and items wanted to complete their collection, using a search and categorization method, such as that described below. A club typically includes one or more administrators and moderators, and can set rates for advertising on the club's web pages or directly marketing to the club members via eMail. Clubs can exchange "ad banners or links" with other groups to market themselves to prospective members.

In one embodiment, the present invention organizes affinity portal 100 according to a collaborative taxonomy and categorization tool. Conventional online communities are organized or categorized according to a single, large hierarchical taxonomy or ontology that is difficult to navigate and to maintain (collaboratively or otherwise). According to the present invention, however, the taxonomy and categorization tool categorizes according to multiple, independent user-defined properties relevant to each affinity group, as illustrated in FIGS. 11 and 12. Each property then results in a hierarchical taxonomy tree (e.g., taxonomy tree 1101, 1202, 1204, or 1206), which is more natural and usually much smaller in the number of possible attribute values for that property than would be expected for a single, large hierarchical taxonomy. A simple list or range of values is a special case of the more general, multi-tier taxonomy tree. The nodes and leaves of the taxonomy tree are assigned numerical values or ranges of numerical values in a hierarchical manner. A node or leaf belongs in a subtree if the assigned value or range of values to the node or leaf lies within the numerical range assigned to the subtree. For example, in taxonomy tree 1101, the subtree South Bay (assigned the range of 235141-235149) is a node in the subtree California, which is assigned the range of 235001-235009.

Thus, instead of having thousands of categories that are inter-related in complex ways, the present invention provides a method that "factors the search space" according to independent, sensible and manageable properties. The properties can be initially seeded by a group of experts; these properties can then be refined and extended over time from the member inputs. Where alternative taxonomy choices exist, each alternative can be treated as an independent property until a de facto standard is found through actual use. The categorization according to the present invention is naturally simpler and more accurate, as the taxonomy is more rational. In any search that traverses one or more taxonomy trees, a member can restrict search or navigation by selecting only a subset (e.g., 1102, 1203, 1205, and 1207) of the allowable range of values in each property involved in the search, thereby finding or traversing only a subtree in the taxonomy tree for that property, or only a range of values delimited by nodes 18 and 22 of the tree sub 1105, possibly in conjunction with fielded, free-text keywords 1104. One aspect of this categorization method allows each dimension or property to be sorted and queried according to a taxonomy tree (e.g. 1101, 1202, 1204, or 1206) and not just as a list of possible attribute values. Consequently, more rational, extensible, scalable, and easy-to-use real-world taxonomies can be created and managed efficiently and collaboratively. Thus, buyers, sellers, and commercial users can match interests 1103, 1208 and find specific affinity groups or individuals. Affinity portal 100 may encompass and categorize a universal, living catalog of goods 1201 as well as individuals according to topics of interest.

As discussed above, an eMail counter-spam method according to one embodiment of the present invention requires a sender's fee for unsolicited eMail. This method not only reduces the volume of unsolicited eMail messages received by a member, it also provides commercial senders (e.g., direct marketers) potential target consumers selected by desired attributes (e.g. income, neighborhood, life-style indicators). For commercial senders, the sender's fee is a reasonable price to pay for a quality, willing mailing list. Since the sender's fee is specified by the recipient in return for a promise to consider the associated eMail message, the sender's fee assures that the commercial sender's eMail messages will receive attention. At the same time, the recipient's time to manage the eMail messages is also properly valued. In other words, the recipient trades off his tolerance for unsolicited eMail messages for the sender's fee received. Some recipients may be willing to receive or read solicitations for a miniscule amount of sender's fee, while others recipient may request significantly higher fees. Thus, this method allows the market forces to determine a price for advertising, thereby benefiting both the senders and the recipients.

Figure 4:
FIG. 4 is a diagram illustrating the treatments of sender's fees according to different classes of senders.

According to one embodiment of the present invention, FIG. 4 is a diagram illustrating the treatments of sender's fees according to different classes of senders. As shown in FIG. 4, to implement the sender's fee feature, the header subject fields 400, 402 and 404 of eMail messages 401, 403 and 405, or another field, is tagged to indicate the amount of fee being paid or offered. In FIG. 4, messages 401, 403 and 405 correspond to eMail messages received from a verified commercial sender, an unverified commercial sender and a verified and approved no-fee sender (e.g., a "friend"). To allow the member to collect the sender's fee after having reviewed the body of the eMail message, the body of the eMail message contains a URL (i.e., a universal resource locator), or a code (e.g., the "accept postage" button presented in the body of the eMail message). The member may return the sender's fee using a similar mechanism (e.g., selecting the "return postage" button presented in the body of the eMail message). In addition, a reply to the eMail message or other transactional action may also be tracked and serve as a click-through (i.e., a recorded action with eCommerce significance). Where a mail reader provides support (e.g., customized mailboxes 105 provided by affinity portal 100), selecting the subject line brings the member to the sender's designated web page through, for example, a redirect. The designated web page may be advertising (for commercial purpose) or requests for contact (for non-commercial purposes). Additional fees may be charged on an impressions-basis as well as for click-through.

In one embodiment, sender's fees may be transferred between accounts maintained by affinity portal 100. The sender's fee may be, but is preferably not, transacted with credit cards or online payment services on a per message basis. If a sender's fee expires uncollected, it is restored to the sender's account. In addition, a member—acting as sender—may specify a maximum acceptable fee without additional request or authorization for eMail messages the member wishes to send. The member may also specify a daily or weekly limit on the number of eMail messages and total fees sent or received.

A service according to the present invention which offers a strong financial incentive for the participants should achieve quick market acceptance. The present invention also provides an on-line resource for finding people. For example, the resource may be used to find a long lost friend or relative, or to establish new relationships. (At the "friend" class, the sender's fee is most likely zero.) This sender's fee feature can also be used by experts who wish to provide pre-paid consultation services over eMail, or by celebrities who wish to make available (for a fee) personal communications or other information desired by their fans.

To facilitate the financial transactions in this online community, and to prevent identity fraud, the participants are preferably confirmed and verified in advance. When an unverified person applies to become a member, relevant biographical information is collected which may include the member's eMail address, name, and organization. The eMail address can be confirmed by the service provider sending the recipient an eMail message at the eMail address, including in the eMail message a URL that the user is required to access to confirm receipt of the eMail message and thereby the address. Alternatively, any other method for confirming the eMail address may be used. One method for verifying the identity of a member is by conducting a nominal financial transaction between the service provider and the member. Such proof of identity may include, for example, providing a verified eMail address used by an online payment service (e.g., an online payment service, or any portal or eCommerce company, especially in a "Federated Network" model), which allows a nominal deposit to be made together with a message containing a password (or URL encoding a Password) that, when exercised, will serve to verify the user. Thus, for example, a user may elect to be verified when he first becomes a member, or he may elect to remain unverified until a financial transaction occurs. The financial transaction may be, for example, payment of a sender's fee, or withdrawal of funds from the sender's fees received as a recipient. Alternatively, the member may submit a credit card number, which allows verification of name and address and allows the affinity portal to charge or credit a nominal amount to the credit card account. For security, the transaction may be password protected. A sender may also be verified by a static IP address associated with the sending eMail server. Additionally, existing members may "vouch for" the applicant user, or a member may build up a reputation or credit over time through controlled interactions within the affinity portal and with other members, or through contributions to the internet at large that can be determined by datamining the WWW and various internet archives. Conversely, the affinity portal may patrol unsanctioned or unacceptable behavior by a member by revoking membership or by placing the member on probation.

To prevent fraud, the service providers should preferably reserve user names that correspond to or resemble celebrity names. A metric to measure responsiveness or helpfulness by the recipients (i.e., a measure of "value" to the senders) should be maintained by the service provider. Alternatively, a rating system such as those maintained on online retail or auction sites, can be maintained by the participants. Such value ratings can be assessed a penalty by the service provider for misdeeds by the member or by those whom the member has "vouched for" or has rated highly. Also, ad click-through and certain resulting transactions are known to the service directly, or indirectly via the advertiser, and can affect a member's value rating.

According to one embodiment of the present invention, a transaction tracking service detects incoming registration or order confirmation eMail messages to avoid mistakenly rejecting such messages as spam and to learn the online shopping behavior of the member. The member's shopping behavior is valuable information to potential advertisers. Collecting, filing and threading confirmation eMail messages are generally helpful services to the member. Confirmation eMail messages not resulting from advertisement, or not originated from within the eMail service can still be detected, especially guided by member activities that associate the names of the senders (e.g., a member's search by name for the sender's messages).

Figure 2:
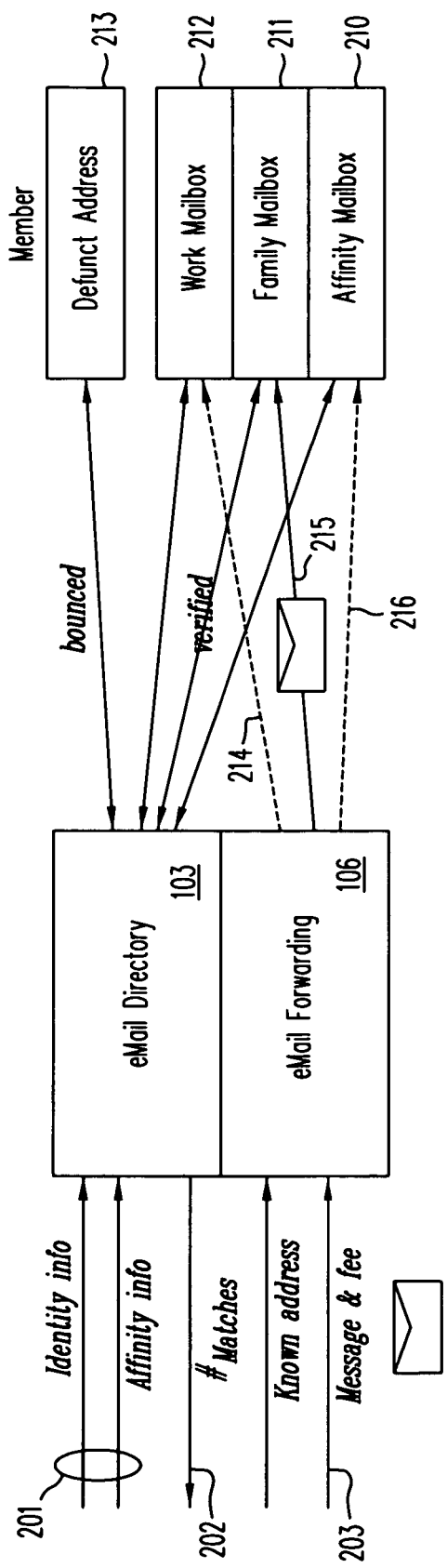
FIG. 2 is a block diagram illustrating the operations of eMail directory & forwarding service, provided in accordance with one embodiment of the present invention.

The block diagram of FIG. 2 further illustrates the operations of electronic directory service 103 and message forwarding service 106. To use searchable electronic directory service 103, a sender specifies set 201 of search criteria (e.g., identity, affinity, personal-history, and location), and obtains list 202 of members matching the search criteria. The maximum number of resulting entries in the list may also be specified. Then, the sender can use the list to send his eMail messages at the sender's fees requested by the members returned in the list. For privacy reasons, a member may request that private financial or biographical information, including the member's identity and eMail addresses, not be disclosed to the sender. In addition, a member may list with the service multiple current and past eMail addresses 210-213. Current addresses can be tagged by category (e.g. work mailbox 212, family mailbox 211, and specific affinity mailbox 210) and are each confirmed to be current by periodically sending the member an eMail message requesting a password or including an URL that the member is expected to select. For past eMail addresses (e.g., defunct address 213), an eMail message is periodically sent to the eMail address to elicit a delivery failure notice to ascertain that it has not been recycled for use by another.

Forwarding service 106 forwards eMail addressed to members. A member may specify how incoming eMail messages for a particular purpose should be routed. For example, a sender may specify a specific purpose (e.g. work, family, or specific affinity) when requesting the eMail service to forward an eMail message to a recipient. The eMail service will forward the eMail message to the selected eMail address the recipient member specifies for that purpose. This service is referred to as "eMail consolidation service". Further, a sender can search for a member using a past eMail address (e.g. an old ISP, job, or school eMail address, such as defunct address 213), and requests the service forward an eMail message to the member's current address (e.g., any of eMail addresses 210-212). This service is referred to as "eMail portability service".

Figure 3:
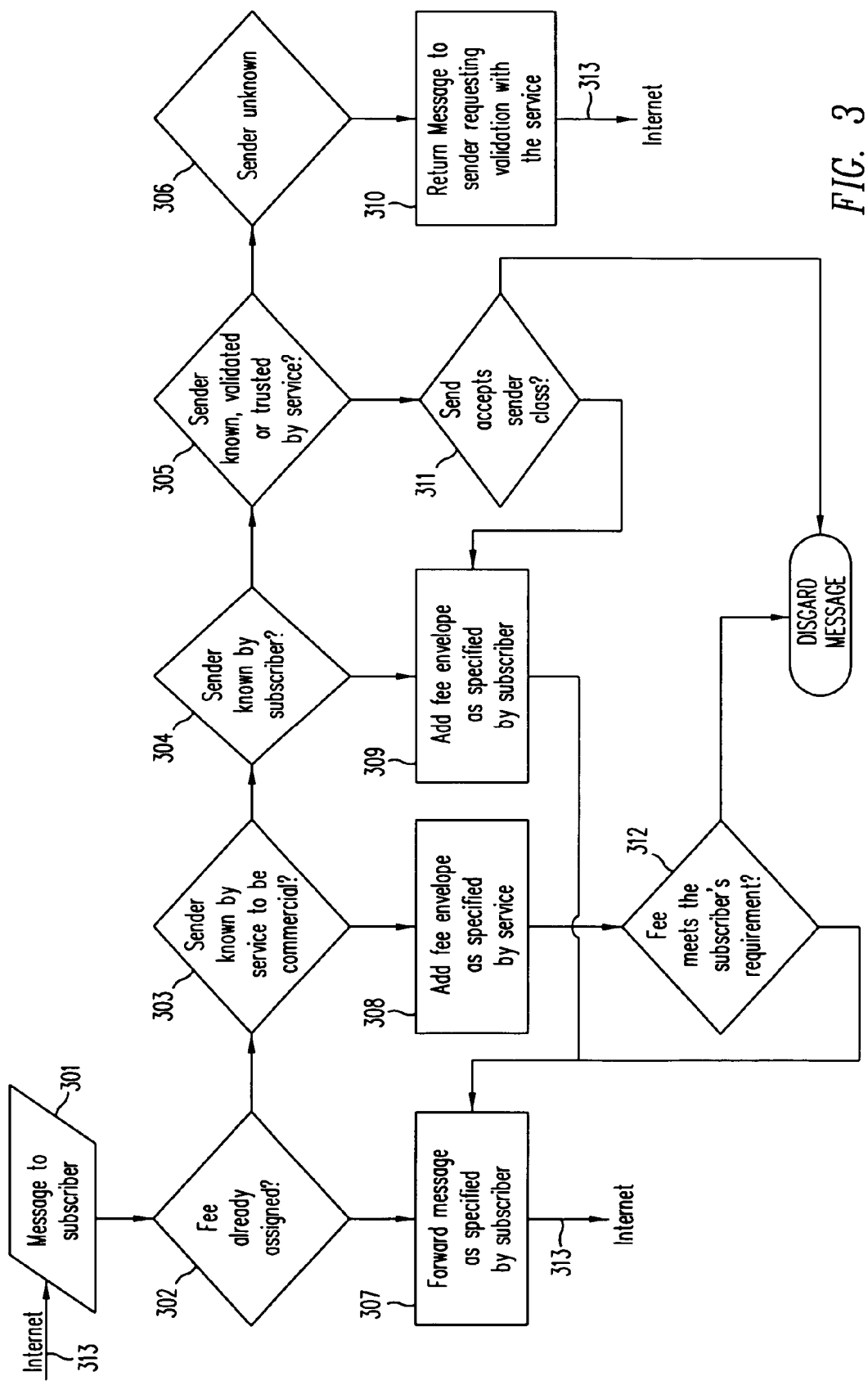
FIG. 3 is a block diagram illustrating in further detail the operations of message forwarding service 106.

FIG. 3 is a block diagram illustrating in further detail the operations of message forwarding service 106. As shown in FIG. 3, when a message is received from the Internet, for example, message forwarding service 106 determines (step 301) the destination of the message. Message forwarding service 106 further determines (step 302) if the requisite sender's fee is provided, or if a sender's fee is not necessary. If the sender's fee is provided or is not necessary, the message is forwarded to the subscriber (step 307). If the fee is not provided, and the sender is one known to affinity portal 100, message forwarding service 106 attaches a "fee envelope" (i.e., authorizes the sender's fee) 308 according to the authorization already on file from the sender. If this sender's fee is determined to meet or exceed the sender's fee specified by the recipient (step 312), the message is forwarded to the recipient (step 307). Otherwise, the message is discarded. If a sender's fee is not provided in the message, but the sender is on a list provided by the recipient (i.e., a sender known to the subscriber) and have previously provided authorization (step 304), the message is forwarded after a fee enveloped is attached (step 309). Otherwise, i.e., the sender has not previously provided authorization (step 305), the message is held until the sender is queried and provides authorization of a sender's fee (step 311). When the sender's fee is authorized, a fee envelope is attached (step 309) and the message is forwarded. If a sender's fee is not provided and the sender is unknown to affinity portal 100 (step 306), the message is returned to the sender with instructions to register and authorize a sender's fee at affinity portal 100 (step 310).

Figure 5:
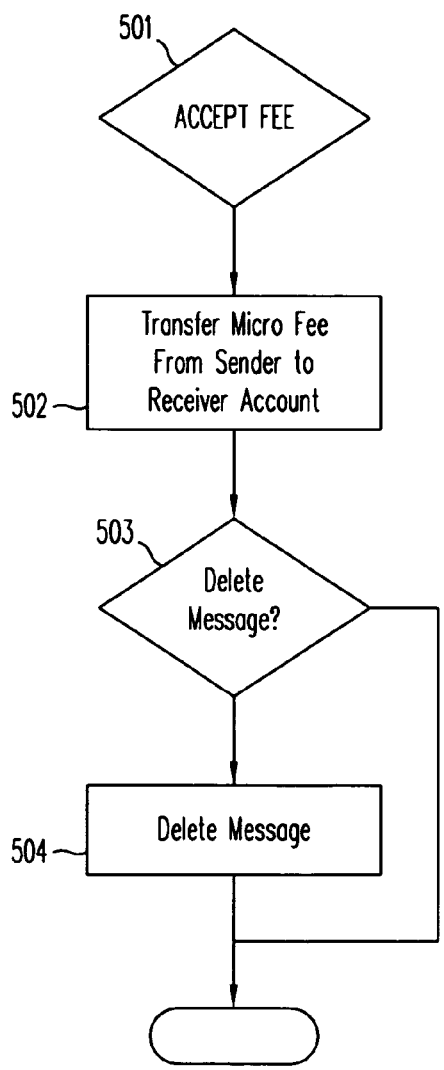
FIGS. 5 and 6 are flow diagrams illustrating the operations of message forwarding service 106 when a member accepts or returns a sender's fee, respectively.
Figure 6:
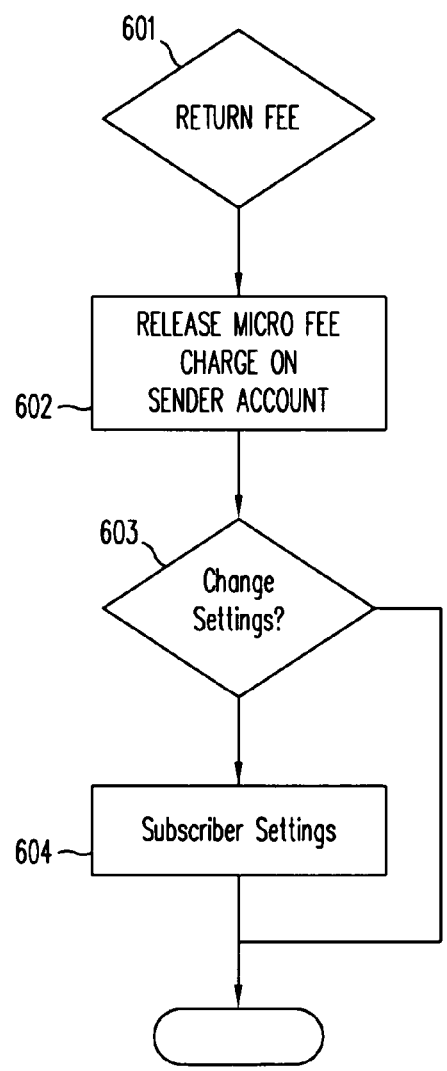

FIGS. 5 and 6 are flow diagrams illustrating the operations message forwarding server 106 when a member accepts or returns a sender's fee, respectively. As shown in FIG. 5, when the recipient accepts the sender's fee (e.g., by selecting the "accept postage" button of FIG. 4), the fee is transferred from the sender's account at affinity portal 100 to the recipient's account (step 502). The recipient, of course, may decide to delete the message after reading (steps 503 and 504). Similarly, as shown in FIG. 6, when the recipient returns the sender's fee (e.g., by selecting the "return postage" button of FIG. 4), the recipient may elect to change subscriber settings 104 to reflect a new rule to be used for the future with respect to the sender to whom the sender's fee is returned (steps 603 and 604). For example, the sender may become a "friend" or no-fee sender with respect to new messages received from the sender.

Figure 8:
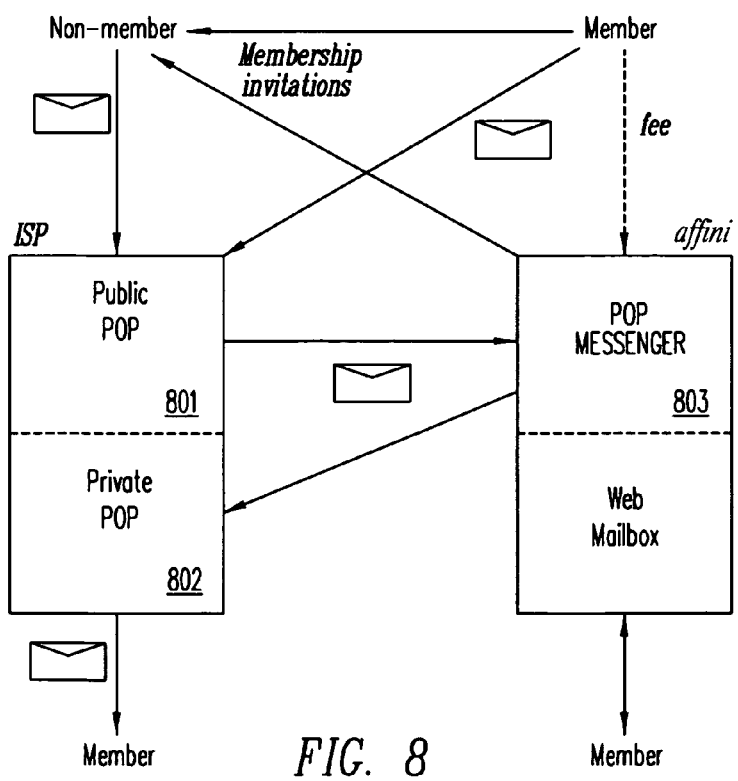
FIG. 8 is a block diagram illustrating the operations of sender verification and invitation service, a component of message forwarding service 106, provided in accordance with one embodiment of the present invention.

The present invention also provides an eMail "route-through" service which filters eMail messages for spam. With this service, a member may maintain all his eMail addresses, such as eMail addresses at existing ISPs or eMail providers. One embodiment, which is called the "POP Messenger" service (POP stands for the internet standard "Post Office Protocol"), illustrated in FIG. 8, requires that a member create with his ISP a private mailbox 802 (e.g. append a secret code to the public eMail address, represented by public POP mailbox 801), if needed. The member then informs message forwarding service 106 of his public and private POP mailboxes 801 and 802. Message forwarding service 106, through POP Messenger module 803, then periodically retrieves eMail messages from the public mailbox 801, performs specified filtering function (e.g., sender verification), and forwards the filtered eMail messages to the private mailbox 802. If the sender of an eMail message is not an existing member, an invitation-to-join or another appropriate notification message 804 may be sent to the sender. Any eMail message that is not delivered to private mailbox 802 (e.g., for a reason such as unverified sender, or insufficient sender's fee) may be placed in escrow with the service, left in the original public mailbox until the deficiency is corrected, or may be rejected immediately or after a specified time delay. If the sender is a member and the applicable sender's fee requested is within the sender's specified allowable limits (both for the eMail message and the sender's specified daily or weekly total, for example), the sender's fee is deducted from the sender's account, and the eMail message is forwarded to the recipient's private mailbox. Otherwise, i.e., if the sender authorization is non-conforming or deficient, a fee authorization request is sent to the sender. Requesting authorization from the sender when the eMail request is non-conforming, provides a method to catch a "spoofed" sender address (i.e., an email addressed fabricated by a spammer imposter to hide its true identity) and to prevent significant damage. If instructed by the member, the eMail service can forward unverified eMail messages to a separate mailbox set aside for probable spam.

According to another embodiment of the present invention, another eMail route-through service—referred to herein as the "POP Butler service"—does not require a separate private mailbox, unlike the POP Messenger service. The POP Butler service checks a member's public mailbox periodically or adaptively[2], so as to perform sender verification services. The messages may have the subject fields of their header modified to indicate status. Any probable spam messages can be deleted by the POP Butler service, or segregated from legitimate eMail messages (e.g., being sent to a holding area). The schedule for checking the public mailbox can be preset or based upon the recent frequency at which a member checks his mailbox.

[2] That is, the time period between activities varies according to recent frequency of activities.

Although the POP Messenger service and POP Butler service are illustrated above using POP, these eMail services can be under other eMail protocols, e.g., IMAP, web-based, and desktop client (plug-in), where multiple folders are provided and eMail messages can be moved among them. Also, if the ISP enables automatic forwarding, the member can have eMail messages forwarded to the eMail service instead of having the eMail service retrieve them from the public mailbox. The member's private mailbox may also reside with the eMail service as a value-added eMail service. Value-added eMail service may included such features as threaded messages, extensive search capabilities, automatic folder assignment[3], messages sorted by sender's fee, folders for shared messages[4], expire-on-delete of uncollected sender's fees, fee-check before send, and movement of messages between folders as verification status changed. In addition to sender verification and sender's fee-related services, other anti-spam methods can be applied to the re-routed eMail messages.

[3] The member's inbox would show the auto-assignment of each message. The user may elect to have all or selected messages moved to the assigned destination folders.

[4] mailing lists or eMail group aliases, advertising etc.

Figure 13:
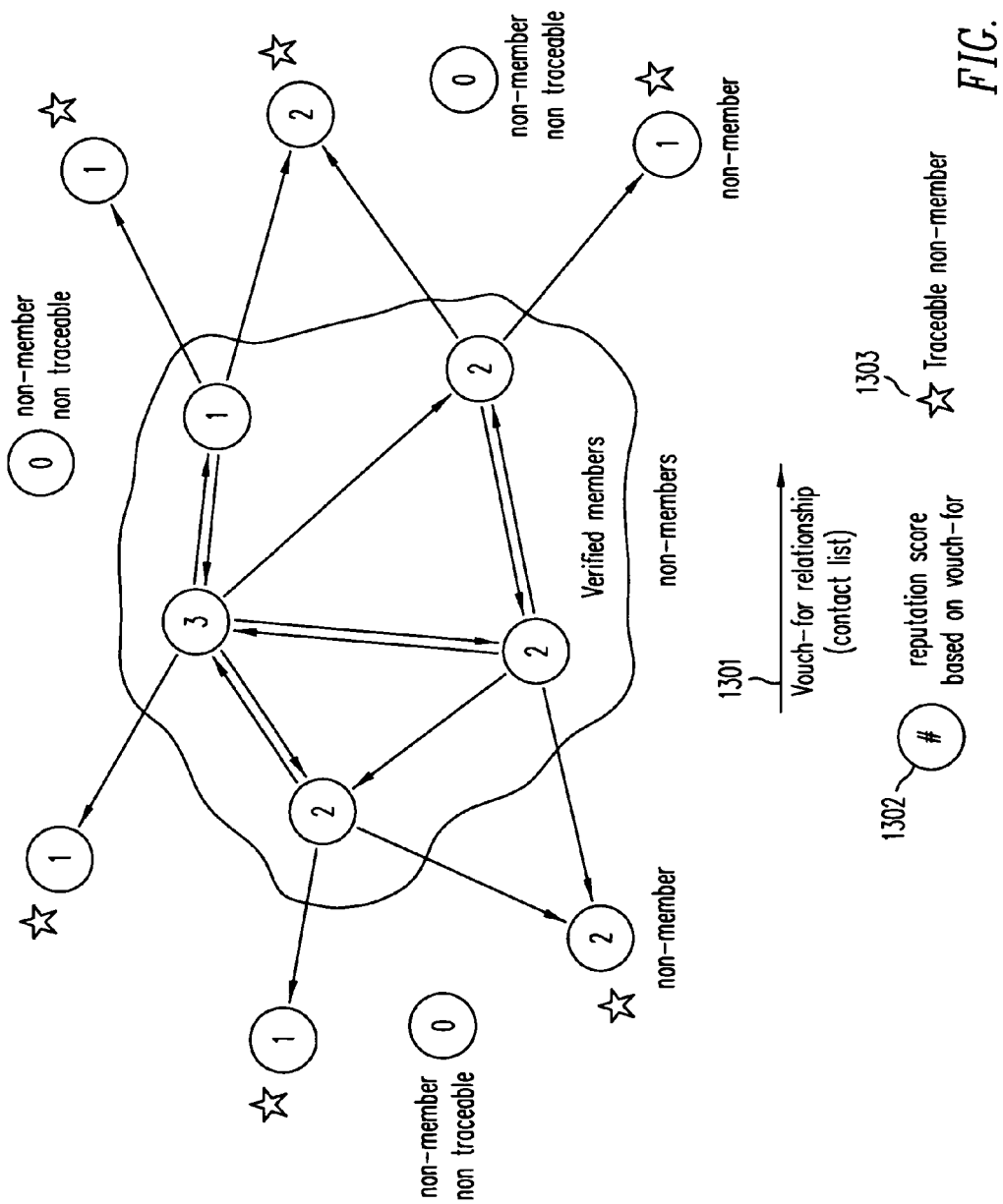
FIG. 13 illustrates the "vouch-for" relationship (a form of contact list) and its usefulness in rating and tracing both members and non-members, in accordance with one embodiment of the present invention.

As illustrated in FIG. 13, a recipient member may also specify or upload a list of approved senders he or she would "vouch for" 1301, so as to allow eMail messages to be routed through without verification, or without payment of a sender's fee. Preferably, any such approved senders are invited to become verified members, when the list is entered or uploaded, or when an eMail message is sent by one of these senders to the member. Such approved contact lists 1301, when combined with other information or data about the persons therein (e.g., information available on the World Wide Web or from third-parties), allow the eMail service to assign or to augment a reputation rating 1302 for such persons, and additionally allow another member to "trace" a non-member 1303. In order to respect the traced person's privacy, the traced person or the member whose contact list provides the information on him or her, is sent a request-for-contact or a request-for-referral message, respectively, by the eMail service. The eMail address of the person being traced need not be disclosed to the person requesting the trace. The eMail service may save a member's accepted or rejected incoming or outgoing eMail 15' contacts to facilitate approval, rating, and tracing. For example, a member may elect to consider as approved any sender who replies to the member's prior eMail message, or to reject, for a specified time period, any eMail message from someone previously rejected.

Figure 16:
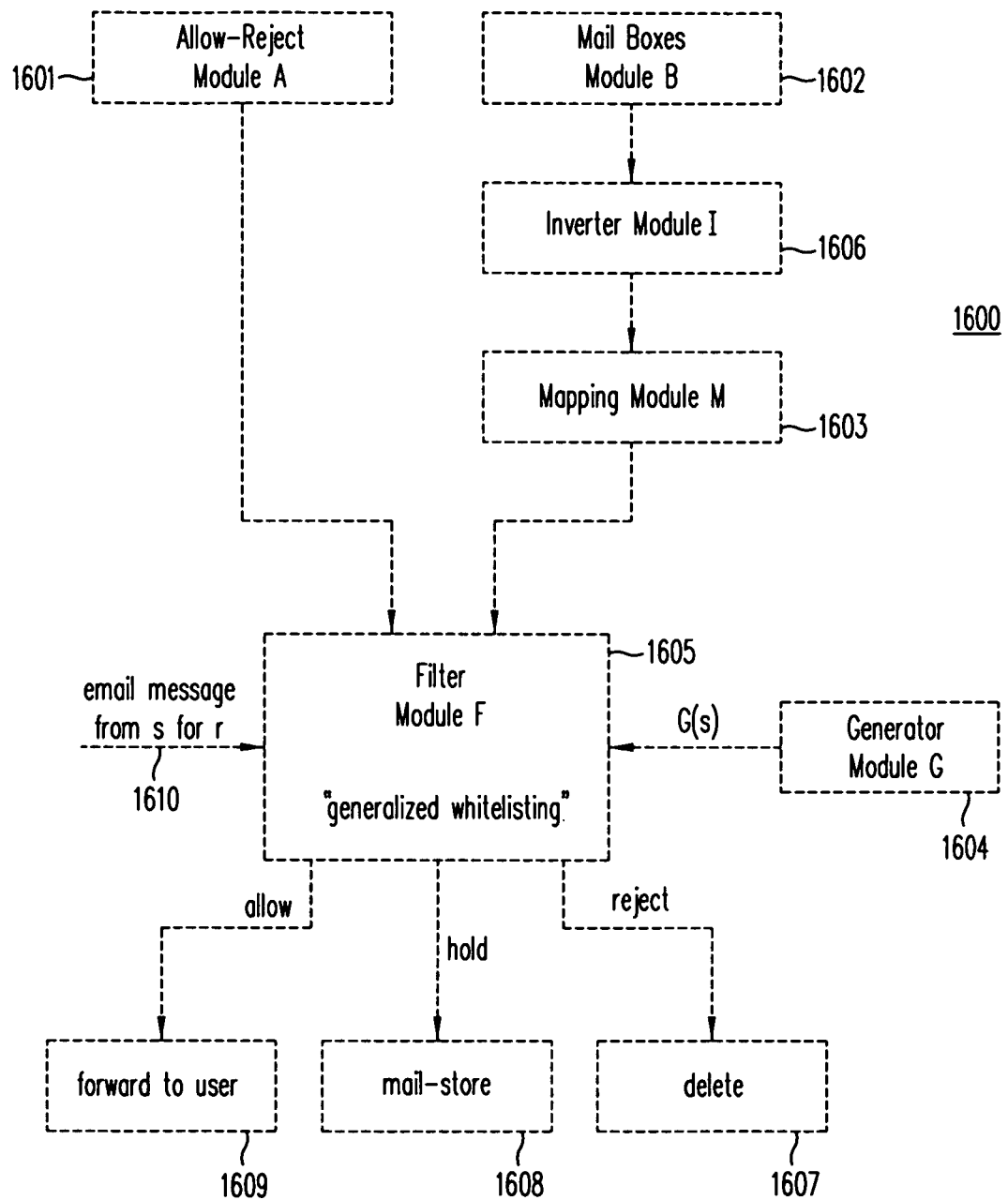
FIG. 16 illustrates a scheme for providing a generalized "whitelisting" service, in accordance with one embodiment of the present invention.

In one embodiment of the present invention, a system for a generalized "white-listing" service is achieved. FIG. 16 shows system 1600, which provides a generalized "white-listing" service in which each registered user R specifies a set A(R) of email addresses or domain names, represented by module 1601, from which email messages are accepted or rejected. Registered user R also claims a set B(R) of email addresses or mailboxes $\{e_1, \ldots, e_N\}$ at which registered user R receives email messages, represented by module 1602. Additionally, for each specified email address or domain name entry, registered user R further specifies whether email messages are to be accepted from subdomains of the specified domains. (A subdomain is an extension to the left of a domain name; e.g., mailserver.company.com is a subdomain of company.com. The subdomains in this instance also include the extensions to the left of the domain name portions of the specified email addresses.)

In FIG. 16, module I represents a service that inverts B(R) (i.e., maps a mailbox to the registered user R claiming it). Module I allows a mapping service M(e), represented by module 1603, which identifies registered user R, if mailbox e is a mailbox specified by registered user R (i.e., M(e) returns R if e belongs to B(R)). If mailbox e does not match any specified mailboxes or email addresses of any registered user, a special NULL value is returned. Module A can be implemented as a service that responds to a query A(R) by returning the set of senders (as identified by email addresses or domain names), each having an attribute value of either "accept" or "reject", as described above. Module G, represented by module 1604, is a service that generates a set of strings G(e) from a given email address $e = \text{name}@d_N.d_{N-1}.\ldots.d_1$:

$G(e) = \{\text{name}@d_K.d_{K-1}.\ldots.d_1$ (email address), $d_K.d_{K-1}.\ldots.d_1$ (domain name) for each K such that $N \geq K \geq 1\}$ (e.g., G(name@mailserver.company.com)={name@mailserver.company.com, name@company.com, name@com, mailserver.company.com, company.com, com}). Filter Module F, represented by Module 1605, determines whether an email message received by the system, from sender address s and addressed to recipient address r should be accepted, rejected, or held.

In one embodiment, filter module F provides the recipient address to mapping module M. If the value returned (i.e., M(r)) is NULL, then filter module F rejects the message, as the recipient is not a registered user. If the returned value is R (i.e., M(r)=R), r is an address specified by registered user R as belonging to him or her. Filter module F also determines if the sender is a registered user through module M. If module M returns the NULL value (i.e., M(s)=NULL), sender address s does not belong to a registered user.

If sender address s is not mapped to any registered user, sender address s and the domain portion of sender address s are separately matched against registered user R's specified list of accepted or rejected email addresses and domain names (i.e., matching sender address s to A(R)). If a match is found with an element of A(R), the email message is accepted or rejected according to registered user R's specified attribute value for the element of A(R). For those email addresses and domain names in A(R) that are specified as accepting subdomains, each such element of A(R) is compared against the strings in the generated set G(s). If a match is found, the email message is accepted or rejected according to registered user R's specified attribute value for that element of A(R). If no match is found, the message is held in a mail-store.

If sender address s belongs to a registered user (i.e., M(s)=S), Module M is queried for each element of A(R) and S is looked up in the set M(A(R)) of registered users whose email messages are accepted or rejected by R. If a match is found, the message is accepted or rejected accordingly. If a match is not found, the email message is held in a mail-store.

For additional efficiency, the email addresses and domain names mentioned above can be encoded as a number or a short string, such as by hashing. Hashing saves both space and computation time for storing and for comparing strings.

The generalized white-listing service described above allows email messages to be received from a user without specifying the exact email address that will be used. This is achieved by specifying just a domain name, or specifying that an email address or domain name match subdomains as well as the specified domain name. Also, if both users are registered users and if any one of a sender's email addresses is accepted by the recipient, then all of the sender's email addresses would be automatically accepted by the recipient.

According to one embodiment of the present invention, this white-listing service may be used in conjunction with the Butler service described above. A user may register a POP3 mailbox with the Butler service by providing the email address of the mailbox, and the POP3 login information. At the time of registration, the Butler service sends a test email message to the mailbox to confirm that the request is legitimate via a two-way communication protocol. That is, the Butler service logs-in and fetches the test message from the inbox folder of the mailbox by scanning or searching (e.g., using a binary-search) until the test message is found. The Butler service then records the timestamp at which the test message is received into the mailbox or, alternatively, records a unique identifier (UIDL) of the test message, commonly provided by the POP3 host. In subsequent processing, the Butler service will leave alone all email messages that are received at the mailbox earlier than this timestamp, so earlier email messages are not subjected to filtering. This procedure allows archived email messages to be exempt from filtering, as many service providers support multiple protocols (e.g. Web, IMAP, POP3) and allow the inbox to be used for both newly arrived messages and archived messages. The Butler service re-visits the POP3 mailbox subsequently according to a schedule that is partly determined by the amount of email messages fetched on one or more previous visits.

Figure 17:
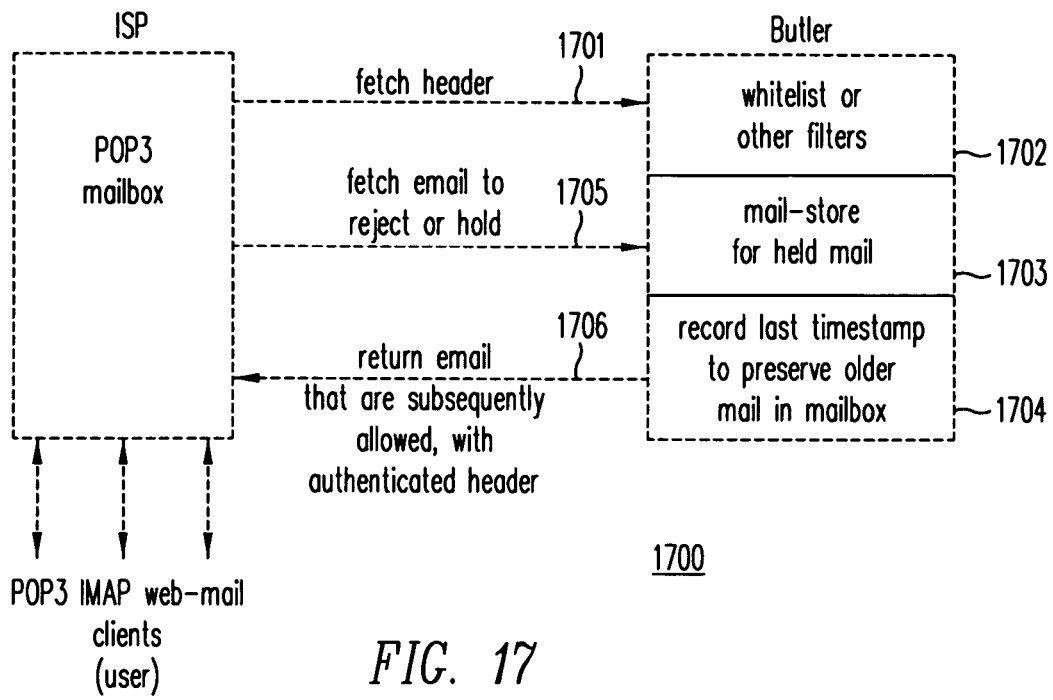
FIG. 17 shows exemplary process 1700 by which the Butler service fetches and filters email messages from a registered mailbox, according to one embodiment of the present invention.

FIG. 17 shows exemplary process 1700 by which the Butler service fetches and filters email messages from a registered mailbox, according to one embodiment of the present invention. As shown in FIG. 17, at step 1701, using the POP3 command TOP or an equivalent service, the Butler service discovers relevant information (e.g., sender and recipient information) from the header of each email message to be examined. Using the white-listing service discussed above, for example, the Butler service determines if the email message is to be accepted, rejected or held (step 1702). If the header information indicates a previous authentication and acceptance (i.e., by authentication information introduced into the header by the Butler service or an equivalent service), such email messages are also accepted. The accepted email messages are left in the inbox. The remaining email messages being processed are deleted from the inbox, those to be held are first downloaded into the mail-store (step 1703). (The Butler service then records the latest timestamp or UIDL, so that older messages relative to this time point are not processed again at a subsequent visit (step 1704).

An email message held in the mail-store may be subsequently accepted, for example by additional tests or processes, whether provided automatically by the system or by the manual intervention of the recipient, sender, or administrator. Email message accepted at the mail-store is then returned by SMTP to the POP3 mailbox, with an authenticated mark in the header to avoid subsequent reprocessing of the same email message for authentication.

A particularly efficient authentication scheme is one that does not require using a database. For example, the authentication mark discussed above can be generated by encoding in a string some relevant information ("INFO") together with some value obtained by applying a private undisclosed hashing function ("secret-hash(INFO)"). Examples of the relevant information for INFO may include an expiration timestamp and transaction specific information. Such an encoded string (INFO, secret-hash(INFO)) is easily generated in real time ("on-the-fly"), used, and later authenticated without having to save it in a database, by re-computing secret-hash(INFO) from the encoded INFO and comparing it against the value found in the encoded string. The secret-hash( ) function can be drawn from a large universe of hash functions that cannot be easily deduced from the hashed value and kept secret. In one embodiment, the encoding function is plain text, relying for security on the secret hash function. The secret hash function can be periodically changed to preserve security.

Figure 18:
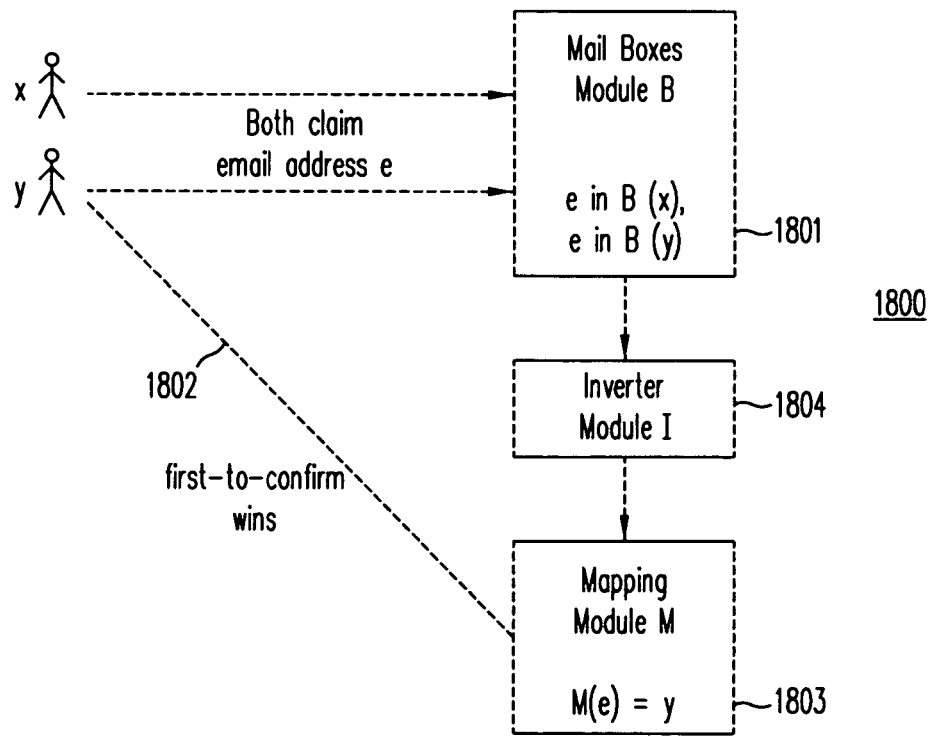
FIG. 18 shows resolution protocol 1800 used in the event that multiple users claim the same email address.

In order to confirm that a registered user has actually authority over an email address that he specifies, an email message containing an authenticated token is sent to that address, the registered user would retrieve the authenticated token from the inbox at the email address, and take some action with the token (e.g., following a hyperlink encoded in the token). It is possible that a claimed email address is not confirmed by the registered user. It is also possible that multiple users claim the same email address, as illustrated in FIG. 18. FIG. 18 shows resolution protocol 1800 used in the event that multiple users claim the same email address. Resolution protocol 1800 is an "asynchronous confirmation" system, in which the first claimant to the address to confirm the authenticated token is presumed to be the owner of the email address. As shown in FIG. 18, in the context of the white-listing service and the Butler services described above, registered users x and y each list address e in their respective B(x) and B(y) sets (indicated generally by reference numeral 1801). The email containing the authenticated token is then sent to email address e. When the earlier one of x and y takes action using the authenticated token, mapping module M assigns the email address to that earlier user (reference numeral 1803). All outstanding and future claims to email address e are disqualified. Asynchronous confirmation prevents a malicious user from gaining any actual advantage from claiming an email addresses belonging to another person. Authority is established only after the confirmation process, such as that illustrated by resolution protocol 1800.

Figure 7:
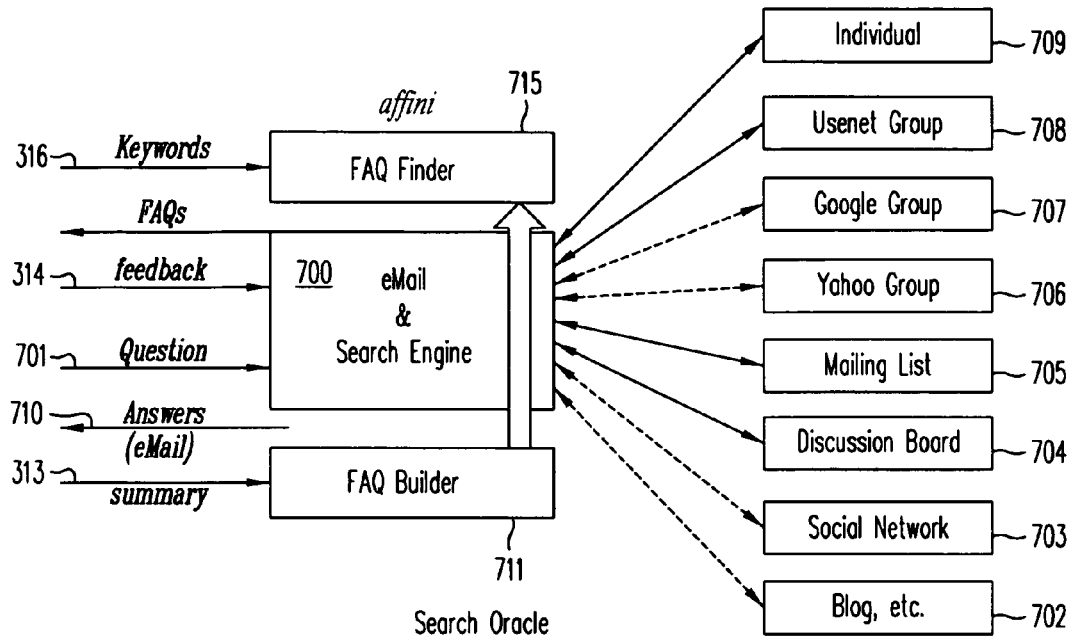
FIG. 7 is a block diagram illustrating the operations of "search oracle" service, one class of subscriber content queries 107, provided in accordance with one embodiment of the present invention.

In addition to biographical, geographical, and demographical information, a member may also specify affinities or interests using keywords, phrases or inference rules. For example, a content search 111 or more specialized "search oracle" service 700 may be provided by affinity portal 100. Profile database 102 may infer affinity from the member's search history, mailing list subscriptions, the member's list of associations or merchants whose eMail messages should be allowed through or rejected, and the member's separate folders or mailboxes and associated filter or routing rules. Each declared affinity may carry a different sender's fee, or have the sender's fee shared differently with the referrer. Additionally, a member may list, for affinity purpose, favorite magazines (for horizontal targeting), music/musicians (for vertical targeting), products, web sites or online communities, and any online content that the member has created. A member can also provide (and organize) his or her collections, wanted, and for-sale lists, so that an affinity marketplace is thus enabled. A member may also declare areas of knowledge or expertise he is willing to provide consultation on by eMail. The member may specify a specific fee amount and the amount of consultation he is willing to provide for a given time period. FIG. 7 provides the operations of search oracle 700 in further detail. As shown in FIG. 7, questions 701 from other members are routed to a member 709 who specifies interest in receiving such questions, or in accordance with the specified criteria to any of appropriate affinity groups 702-708. Thus, for members who are subject experts or are celebrities, fee-bearing services may be conducted within such an online community; as well, an affinity group may itself charge fees for answering questions. Answers from individuals 709 or affinity groups 702-708 responsive to questions 701 are collected and collated, and sent by eMail 710 to the members who posed the questions. Questions and answers are also archived and monitored, and when certain criteria are met (e.g., the number of times questions having a specific set of keywords exceed a specified threshold), the matching questions and answers are provided to FAQ builder 711 to be placed into a FAQ database. Members are encouraged to provide feedback (714) and summary (713) to search oracle service 700 to help improve, classify, rank and categorize the questions and answers in the FAQ database. Questions in the FAQ database are retrieved through FAQ finder 715, using keywords 716, for example. The FAQ database improves the human-scalability of the search oracle, i.e. fewer questions need to be answered by humans as the database increases in size.

FIG. 14 summarizes the various, optional, steps in the user registration process, in accordance with one embodiment of the present invention. Identity confirmation 1401 occurs when a non-member tries to register at the service provider's web site, when he or she sends an eMail message to a member who requests sender verification, or when the sender is a member but the eMail had been sent using someone else's computer or eMail server ("roaming"), as determined from IP address in the eMail header. Identity verification 1402 then tries to create a financially-traceable connection with the user, by charging or crediting the user's existing, verified financial accounts with a credit card or an online payment service. Spam filtering 1403 gives the user control over the extent of sender verification the user finds desirable: "positive internet reputation" determined from "vouch-for" ratings by other members and from datamining the World Wide Web and internet archives; financially-verified sender who may be willing to pay a fee to the recipient; the user's contact list; positive response to a verification invitation. If the user chooses some form of spam filtering, he or she then enters the necessary information for the service provider to provide POP Messenger, POP Butler, or other eMail filtering services. The user then enters profile and preferences 1404 which go into profile database 102, electronic address directory 103, and subscriber settings 104. The user can enter or upload a contact list 1405 and choose whether to vouch for senders on the list (including mailing lists, online retailers, or other bulk eMail senders) thereby enhancing their reputation rating, and whether to request they reciprocate by vouching back.

Figure 15:
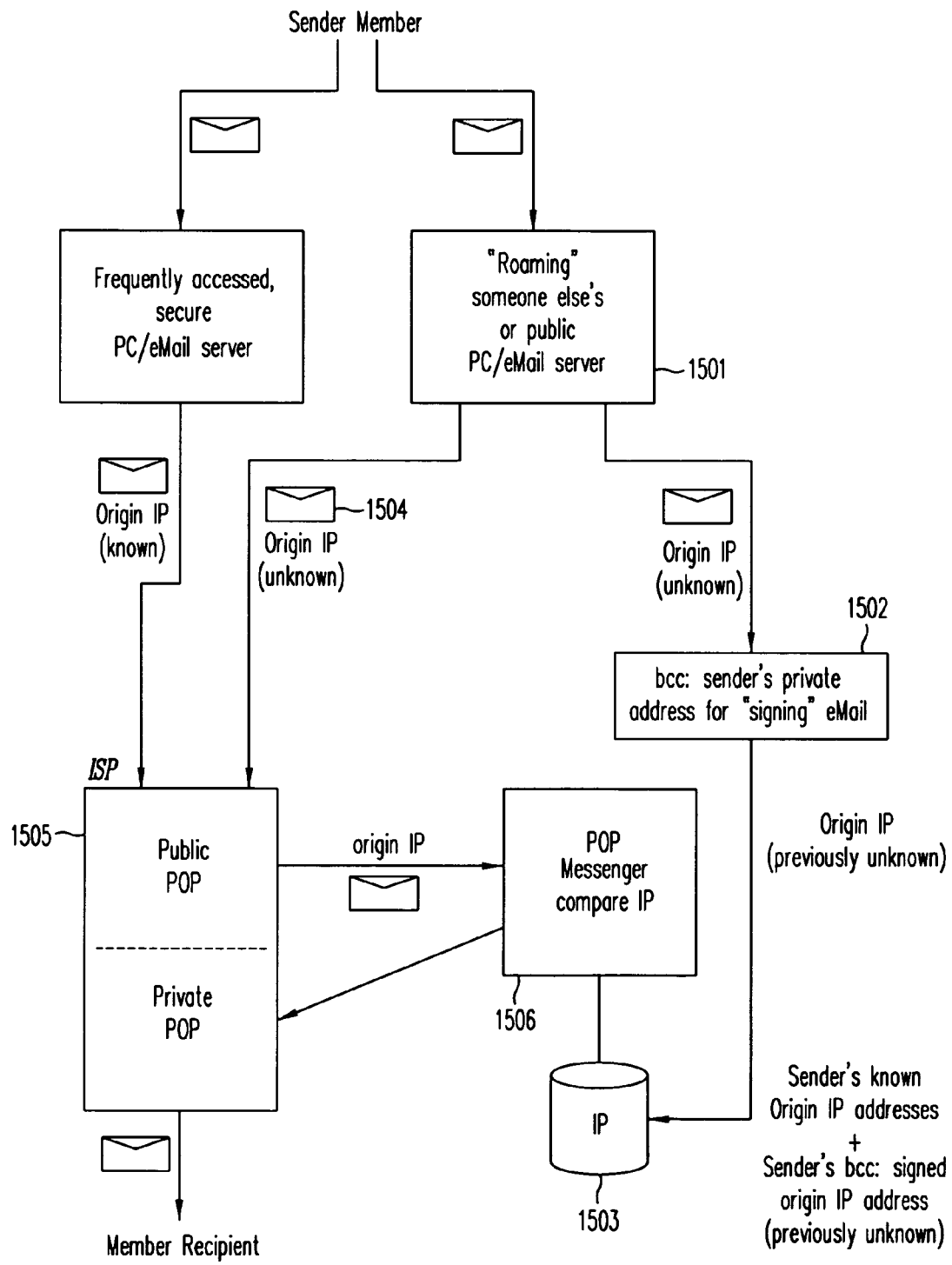
FIG. 15 is a block diagram illustrating the operations of a sender verification service when the sender is roaming and needs to add a previously unknown eMail server (identified by its origin IP address) as a valid designated sender, in accordance with one embodiment of the present invention.

As illustrated in FIG. 15, a sender member can always notify the service provider he or she is roaming 1501 by visiting the web site or by "blind-copy" bcc: a special private address 1502 assigned to the member's account, which registers with database 1503 the origin IP address of the eMail server as valid for this sender, for a period of time. The "bcc: private address" method is generally applicable as a convenient means for a member to notify the service provider of his or her whereabouts (IP address of eMail server), or to authenticate or sign the eMail message that is sent as coming from the member and not from a spammer. (A spammer who "spoofs" or forges an eMail header From: address to be that of a sender member, cannot authenticate the eMail or the origin IP address in this manner, since the spammer does not know the bcc: private address; so the spoof will be caught based on invalid origin IP address which does not match any in database 1503 for the sender member.) When the thus signed eMail message 1504 reaches the recipient member's mailbox 1505, the service provider (for example POP messenger 1506) while checking the origin IP address against database 1503 will allow the eMail message to pass through, based on the bcc: signed eMail arriving at 1502 that shares the origin IP address with the eMail message 1504 addressed to the recipient. Thus, the roaming sender expediently adds a previously unknown eMail server 1501 to his or her list of known, valid "designated sender" eMail servers.

Figure 10:
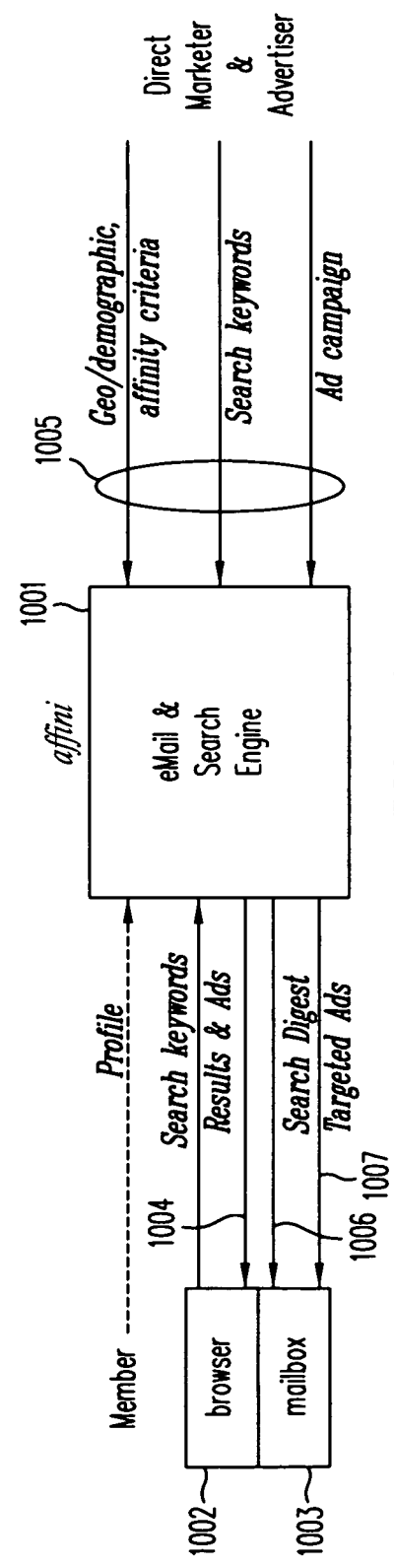
FIG. 10 is a block diagram illustrating eMail marketing service ("second-chance search advertisement"), a form of consumer gateway service 101, provided in accordance with one embodiment of the present invention.

According to another embodiment of the present invention, a method for targeted advertisement, which is referred herein as "second-chance search advertisement" service, is illustrated in FIG. 10 by second chance advertisement service 1001. In second chance advertisement service 1001, a member may search for information in the WWW and from other sources, using a search box (1002) or by sending an eMail message (1003) to a specified eMail address (e.g. ask@Service or more selectively faq@Service, who@Service, whatis@Service, where2buy@Service), using keywords. When searching using an eMail message, the query is typically included in the subject line or in the message body. Result 1004 of the query, which may be returned via a web browser or in an eMail message, or both, may be accompanied by advertisements which are selected not only based on the keywords in the query, but also according to matching the querying member's identity and affinity with the advertisers specified desired criteria 1005. In addition, second chance search advertisement service 1001 may extract, re-position, modify or redirect the advertisement for various modes of delivery and tracking click-through, both on the results page or pages and separately via eMail. The results pages may also allow the user to select all or some of the results and request a search digest or summary 1006 to be sent by eMail for later use (possibly cumulatively over multiple searches). Additionally, a "try harder" button may be provided so that the member can request that the query be repeated or iterated for more relevant or better results from the search engine, for example, through more time-consuming calculations, targeted web crawling and content discovery, or even by forwarding the query to a human expert or an online community, as provided by search oracle service 700 of FIG. 7. Replies to such requests may be delivered by eMail back to the member. Both WWW search request and results can be sent through e-mail (for example, query in the subject line of an e-mail to a search engine address). E-mail is especially effective and popular medium for conducting search, since e-mail are easily sent, received, saved, and forwarded to others.

The present invention also provides a method for providing direct feedback to on-line advertisers and for providing indirect incentive to the advertising target, according to another aspect of the present invention. At present, most responses to online advertisement are tracked and measured as "click-throughs" of text or image hyperlinks to products or services that are being promoted. Such hyperlinks appear, for example, on a web page, inside a personal-computer window, or embedded in an email message.

In prevailing online advertising partnerships, the owner of an advertising "channel" (e.g., a provider of web-content) receives a bounty that is calculated according to the number of click-throughs, impressions or both. To prevent unfairly skewing the number of click-throughs to the advertising and to prevent a channel owner from unjustly increasing the payout, a channel may not induce its users to click-through advertisements by providing incentives. Also, there is typically no direct mechanism for a user to encourage or discourage more advertisements of the type he or she has just been shown.

According to one embodiment of the present invention, a method for a user to provide direct feedback to an advertiser is provided. Based on this direct feedback, an advertiser may be able to rate the effectiveness of an advertisement. This method may also be used in conjunction with a method that provides an indirect incentive to the user, so as to entice the user to provide such feedback and thereby, to receive additional, more relevant individually targeted advertising. These methods—direct feedback and indirect incentives—can be used separately or together in all types and channels of online advertising, including email advertising.

Figure 19A:
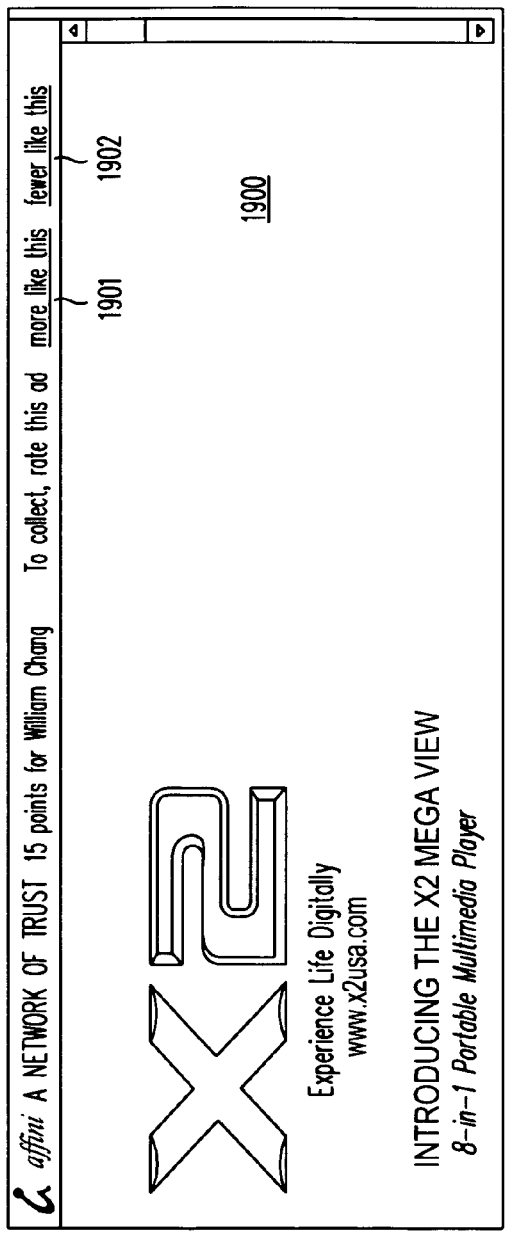
FIGS. 19a and 19b illustrate advertisement 1900 with direct feedback, according to one embodiment of the present invention.
Figure 19B:
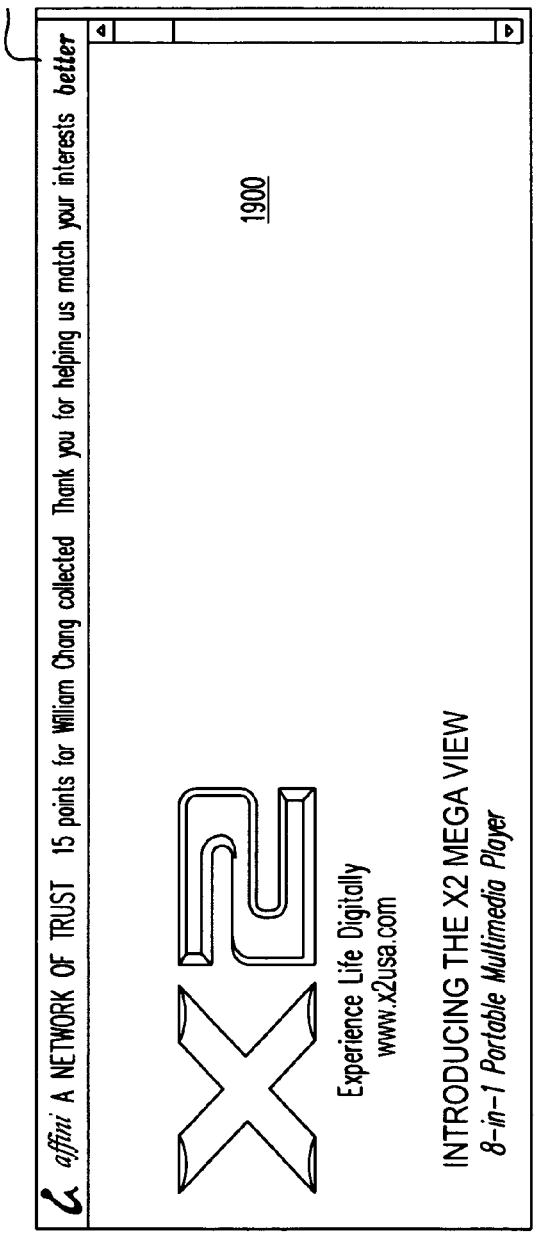

FIGS. 19a and 19b illustrate advertisement 1900 with direct feedback, according to one embodiment of the present invention. Specifically, FIG. 19a illustrates an exemplary advertisement which offers an "indirect incentive" to induce a user to click on positive and negative feedback links 1901 and 1902. The incentive is indirect as it does not reward the user for responding to the subject matter of the advertising, but for their help in evaluating the effectiveness of the advertising. As shown in FIG. 19a, at the top edge of an advertising banner, is offered indirect incentive and instruction to collect the incentive: "To collect, rate this ad: more like this fewer like this". Embedded under the text messages more like this and fewer like this are hyperlinks under an appropriate hypertext markup language that is processed by the channel's advertising engine ("Ad Engine). When the user responds by clicking one of the feedback links (i.e., by indicating whether the user would prefer seeing more or less instances of advertisements of the same type), a message is displayed: "Thank you for helping us match your interests better", as shown in FIG. 19b, and the user collects the incentive fee.

The channel's Ad Engine then incorporates the direct feedback in future selection of targeted advertising for that user, and also for other users. If an advertisement is untargeted, offensive, or otherwise rated negatively by many users, the Ad Engine may re-adjust the targeting algorithm for that advertisement, or progressively and adaptively replace the advertisement with advertisements for other products, or with alternative advertising creative for the same product, that are rated more positively by the general audience or by specific segments of the audience.

In one embodiment, the data obtained from direct feedback is provided back to the advertiser as market research data. The data may answer some of the following questions: (a) whether or not a particular user (or a particular user segment) is likely to buy; (b) whether or not a particular cross-sell marketing strategy is effective; and (c) whether a specific advertisement creative effectively promotes a product or communicates a marketing message. The present invention is a new way for advertisers to obtain valuable market research data and to provide incentives to users rating their creation.

The fee-based open eMail directory of the present invention is also applicable in a corporate private network communication or mail system context. In such a context, the fee may be based on an artificial and private currency. For example, the currency may be issued for internally facilitating and prioritizing corporate communications. Some application includes allowing employees to spend the currency according to urgency of the message. The currency can also be used to induce employees to profile their knowledge or expertise in greater depth in a corporate directory.

Thus, through a combination of features and value-added services, the eMail service is in a position to send highly targeted eMail advertisement 1007, based on information derived from a member's search history and the member's declarative and behavioral profiles. Keyword based advertisements in search results are often ignored because the searcher is too focused on the search results. In contrast, because second chance search advertisement service 1001 has access to eMail address of the querying member, the service offers repeated opportunities and better targeting for advertisers to reach the querying member over time using fee-bearing eMail messages to the querying member, based on the member's search history. The querying member is more likely to be responsive to the resulting advertisement, as they are targeted to the querying member's needs and the fee-bearing eMail messages may be reviewed at the member's leisure.

The above detailed description is provided to illustrate the specific embodiments of the present invention. Numerous variations and modifications within the scope of the present invention are possible. The present invention is set forth in the following claims.

We claim:

1. A method for filtering email messages for a user, comprising:
   obtaining from the user a first set of email addresses belonging to the user and a second set of email addresses; and
   for each email address in the first set of email addresses:
      according to an adaptively set schedule, accessing a mailbox corresponding to that email address;
      identifying email messages in the accessed mailbox that include a recipient address matching one of the email addresses in the first set of email addresses;
      accepting, rejecting or holding for user acceptance each identified email message according to a set of criteria including whether or not that identified email message is sent from an email address in the second set of email addresses; and
      marking header information of each accepted email message with an authentication token generated using an authentication scheme that is based on a predetermined hash-function, the authentication token identifying application of the method of filtering.

2. A method as in claim 1, wherein the user further specifies rejecting email messages from any of the addresses in the second set of email addresses.

3. A method as in claim 2, further comprising providing a mail-store to store email messages from addresses not identified in the second set of email addresses.

4. A method as in claim 1, wherein the second set of email addresses further comprises domain names.

5. A method as in claim 1, wherein an identified email message is accepted when it is sent from a subdomain email address under a domain present in the second set of email addresses.

6. A method as in claim 4, wherein an identified email message is accepted when it is sent from a subdomain email address under a domain present in the second set of email addresses.

7. A method as in claim 1, further comprising, when the user accepts an email message from an email address not specified in the second set of email addresses, accepting email messages sent from that email address to any address specified in the first set of email addresses.

8. A method as in claim 1, wherein the method is applied to managing email messages in a mailbox.

9. A method as in claim 1, further comprising providing a mapping module that identifies the user given an address in the user's first set of email addresses.

10. A method for a service that manages email messages in a mailbox for a user, comprising:
   at a scheduled next access time:
      accessing the mailbox to fetch header information from email messages received into the mailbox since a previous access by the service to the mailbox;
      examining the header information of each email message to identify email messages that should be removed from the mailbox, based on information provided by the user, and based on whether or not an authentication mark indicating a previous authentication is included in the header information;
      removing from the mailbox the identified email messages;
      marking the header information of examined email messages remaining in the mailbox with an authentication token generated using an authentication scheme that is based on a predetermined hash-function, the authentication token identifying application of the method by the service; and
      setting the scheduled next access time, based in part on a number of the email messages examined.

11. A method as in claim 10, wherein the mailbox is accessed using a POP3 protocol.

12. A method as in claim 10, wherein the examining is carried out using a white-listing service.

13. A method as in claim 10, wherein the email messages removed are transferred to a mail-store.

14. A method as in claim 10, wherein email messages removed included email messages to be rejected and email messages to be further examined.

15. A method as in claim 13, further comprising returning email messages to the mailbox upon further examination of the email messages removed.

16. A method as in claim 15, wherein email messages returned to the mailbox are marked using an authenticated token in the header information.

17. A method as in claim 16, wherein the authenticated token includes information encoded using a predetermined hash-function.

\* \* \* \* \*